United States Patent
Millar et al.

(10) Patent No.: US 11,026,373 B2
(45) Date of Patent: Jun. 8, 2021

(54) SYSTEMS AND METHODS FOR PRESSURIZING AN ASSEMBLY LINE GROW POD

(71) Applicant: Grow Solutions Tech LLC, Lehi, UT (US)

(72) Inventors: Gary Bret Millar, Highland, UT (US); Mark Gerald Stott, Eagle Mountain, UT (US); Michael Stephen Hurst, Farmington, UT (US)

(73) Assignee: Grow Solutions Tech LLC, Vineyard, UT (US)

(*) Notice: Subject to any disclaimer, the term of this patent is extended or adjusted under 35 U.S.C. 154(b) by 492 days.

(21) Appl. No.: 15/985,497

(22) Filed: May 21, 2018

(65) Prior Publication Data
US 2018/0359941 A1   Dec. 20, 2018

Related U.S. Application Data

(60) Provisional application No. 62/519,628, filed on Jun. 14, 2017.

(51) Int. Cl.
| | | |
|---|---|---|
| G06F 7/00 | (2006.01) | |
| A01G 9/14 | (2006.01) | |
| A01D 91/00 | (2006.01) | |
| A01G 9/08 | (2006.01) | |
| A01G 9/24 | (2006.01) | |
| A01G 31/04 | (2006.01) | |

(52) U.S. Cl.
CPC ........... *A01G 9/1469* (2013.01); *A01D 91/00* (2013.01); *A01G 9/088* (2013.01); *A01G 9/1415* (2013.01); *A01G 9/246* (2013.01); *A01G 31/042* (2013.01)

(58) Field of Classification Search
CPC .... A01G 9/1469; A01G 9/088; A01G 9/1415; A01G 9/246; A01G 31/042; A01D 91/00; Y02P 60/21; Y02A 40/25
USPC ................................ 700/213–214, 228, 230
See application file for complete search history.

(56) References Cited

U.S. PATENT DOCUMENTS

| 4,718,130 A | * | 1/1988 | Steinback | ............. F24F 5/0071 |
| | | | | 4/499 |
| 5,849,053 A | * | 12/1998 | Napadow | ................ B05B 14/43 |
| | | | | 55/385.2 |

(Continued)

FOREIGN PATENT DOCUMENTS

| CN | 205511182 U | 8/2016 |
| FR | 2315844 A1 | 1/1977 |

(Continued)

OTHER PUBLICATIONS

International Search Report and Written Opinion for PCT/US2018/034277 dated Sep. 28, 2018, 20 pages.

*Primary Examiner* — Yolanda R Cumbess
(74) *Attorney, Agent, or Firm* — Dinsmore & Shohl LLP

(57) ABSTRACT

A method for pressurizing an assembly line grow pod system is provided. The method includes arranging a dual wall including an outer wall and an inner wall, controlling, with an air pressure controller, first air pressure in the first sealed area and second air pressure in the second sealed area, and controlling, with a master controller, operations of the air pressure controller. The first air pressure of the first sealed area is controlled to be higher than pressure of an exterior area to the outer wall by a predetermined amount.

20 Claims, 6 Drawing Sheets

(56) References Cited

U.S. PATENT DOCUMENTS

| | | | |
|---|---|---|---|
| 6,061,969 A | 5/2000 | Leary | |
| 6,968,745 B1 * | 11/2005 | Fex, Jr. | ........... G01L 19/08 |
| | | | 73/700 |
| 2007/0130844 A1 * | 6/2007 | Arts | ............ E04H 1/125 |
| | | | 52/79.1 |
| 2014/0053463 A1 | 2/2014 | Khaled | |
| 2016/0066516 A1 | 3/2016 | Palmieri, Jr. | |

FOREIGN PATENT DOCUMENTS

| WO | 2008/069658 A1 | 6/2008 |
|---|---|---|
| WO | WO2009074758 A2 | 6/2009 |
| WO | WO2010097546 A1 | 9/2010 |
| WO | 2016/103898 A1 | 6/2016 |

* cited by examiner

US 11,026,373 B2

SYSTEMS AND METHODS FOR PRESSURIZING AN ASSEMBLY LINE GROW POD

CROSS REFERENCE

This application claims the benefit of U.S. Provisional Application Ser. No. 62/519,628, filed on Jun. 14, 2017, which is incorporated by reference in its entirety.

TECHNICAL FIELD

Embodiments described herein generally relate to systems and methods for pressurizing a grow pod and, more specifically, to pressurizing a grow pod within an exterior enclosure having a dual wall.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food. Accordingly, there is a need to provide an organized plant grow pod system which facilitates a quick growing, small footprint, chemical free, low labor solution to growing microgreens and other plants for harvesting. At the same time, there is a need that the organized plant grow pod system may provide controlled and optimal environmental conditions (e.g., the timing and wavelength of light, pressure, temperature, watering, nutrients, molecular atmosphere, and/or other variables) in order to maximize plant growth and output. In particular, it is important to ensure that plants or seeds will not be affected by, or exposed to unfavorable growth conditions such as insects, mold, microorganism, etc. which would have potentially entered into the organized plant grow pod system and caused significant impact or damage on plant growth and output.

SUMMARY

Systems and methods for pressurizing an assembly line grow pod are described. One embodiment of a method for pressurizing an assembly line grow pod system includes arranging a dual wall including an outer wall and an inner wall, controlling, with an air pressure controller, first air pressure in the first sealed area and second air pressure in the second sealed area, and controlling, with a master controller, operation of the air pressure controller. Arranging the dual wall further includes arranging a first sealed area between the outer wall and the inner wall and arranging a second sealed area in an interior space surrounded by the inner wall. Controlling, with the air pressure controller, first air pressure in the first sealed area and second air pressure in the second sealed area, further includes controlling the first air pressure of the first sealed area higher than pressure of an exterior area to the outer wall by a predetermined amount. Controlling, with the master controller, operations of the air pressure controller further includes controlling operations of the air pressure controller by sending an instruction to increase or decrease the first air pressure in the first sealed area, the second air pressure the second sealed area, or both. The method further includes arranging the master controller and the air pressure controller in the interior space surrounded by the inner wall.

In another embodiment, a system for pressurizing an assembly line grow pod system, includes an enclosure, an air pressure controller and a master controller. The enclosure includes dual walls including an outer wall and an inner wall, a first sealed area arranged between the outer wall and the inner wall, and a second sealed area arranged in an interior space surrounded by the inner wall. The air pressure controller controls first air pressure in the first sealed area and second air pressure in the second sealed area. The air pressure controller further controls the first air pressure of the first sealed area higher than pressure of an exterior area to the enclosure by a predetermined amount. The master controller controls operation of the air pressure controller by sending an instruction to increase or decrease the first air pressure in the first sealed area, the second air pressure in the second sealed area, or both. The master controller and the air pressure controller are arranged in the interior space surrounded by the inner wall.

In yet another embodiment, a pressurizing system for use in an assembly line grow pod, includes a first sealed area and a second sealed area. The first sealed area has air pressure set to be higher than external air pressure. The second sealed area is surrounded by the first sealed area and houses an assembly line grow pod. The pressurizing system further includes an air pressure controller for controlling the air pressure of the first sealed area and a master controller. The master controller includes a processor and a memory for storing instructions and a predetermined air pressure range indicative of optimal air pressure for the assembly line grow pod. The instructions, upon execution by the processor, perform operations including (i) obtaining the external air pressure; comparing the first air pressure of the first sealed area with the external air pressure; (ii) determining whether the first air pressure is higher than the external air pressure amount; and (iii) upon determination that a difference between the first air pressure and the external air pressure is outside of the predetermined air pressure range, causing the air pressure controller to increase or decrease the air pressure of the first sealed area.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for pressurizing a grow pod. Some embodiments are configured with an exterior enclosure for enclosing a grow pod and an air pressure controller. The exterior enclosure includes an outer wall and an inner wall, and the air pressure controller controls an air pressure of a first sealed area between the outer wall and the inner wall such that the air pressure of the first sealed area is greater than an air pressure of an exterior area outside the outer wall by a predetermined amount. The positive pressure created in the first sealed area prevents external contaminants from entering the exterior enclosure. The systems and methods for pressurizing a grow pod incorporating the same will be described in more detail, below.

Figure 1:
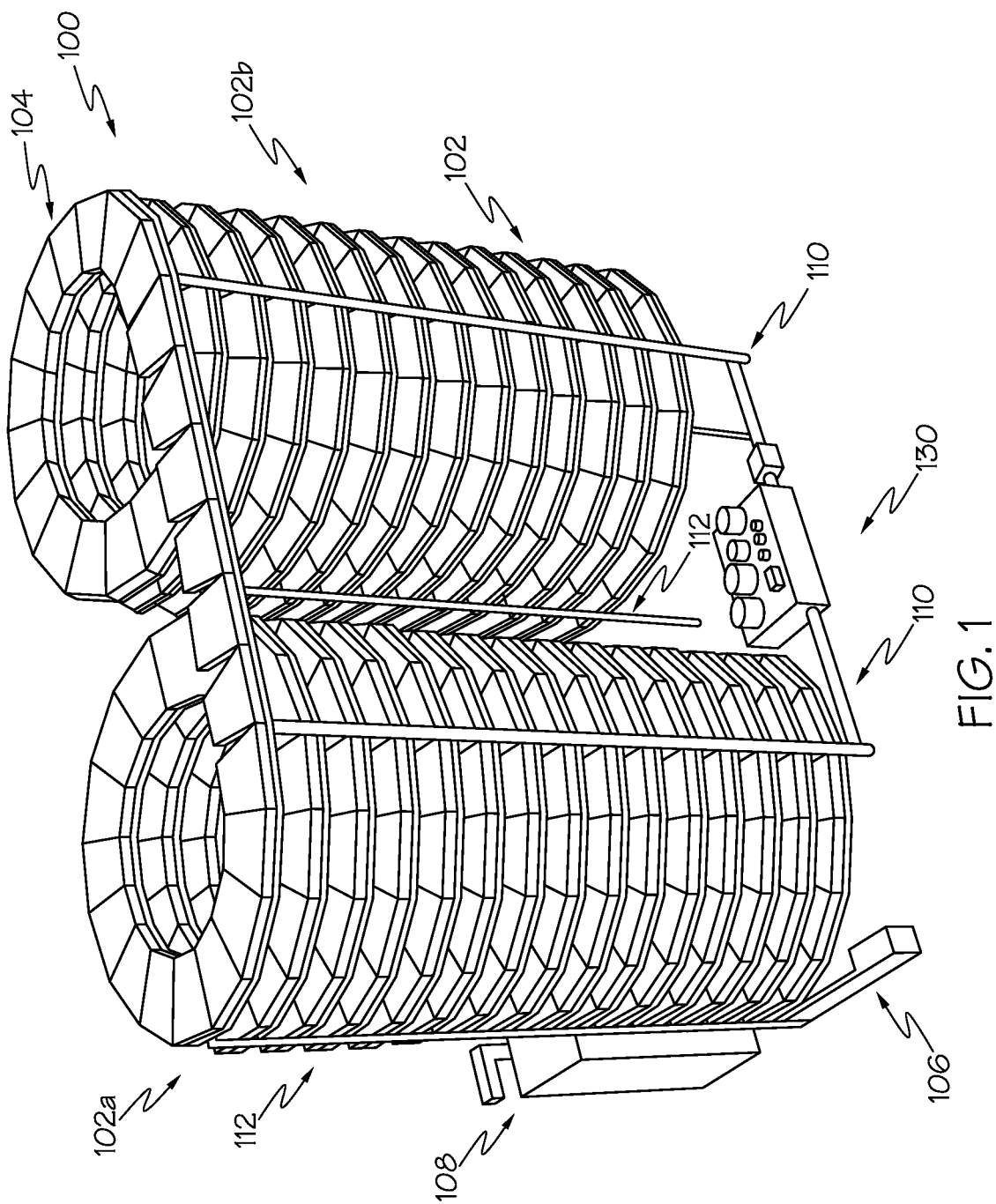
FIG. 1 depicts an assembly line grow pod, according to embodiments described herein.

Referring now to the drawings, FIG. 1 depicts an assembly line grow pod 100, according to embodiments described herein. As illustrated, the assembly line grow pod 100 may include a track 102 that holds one or more carts 104. The track 102 may include an ascending portion 102a, a descending portion 102b, and a connection portion 102c. The track 102 may wrap around (in a counterclockwise direction in FIG. 1) a first axis such that the carts 104 ascend upward in a vertical direction. The connection portion 102c may be relatively level (although this is not a requirement and is utilized to transfer carts 104 to the descending portion 102b. The descending portion 102b may be wrapped around a second axis (again in a counterclockwise direction in FIG. 1) that is substantially parallel to the first axis, such that the carts 104 may be returned closer to ground level.

While not explicitly illustrated in FIG. 1, the assembly line grow pod 100 may also include a plurality of lighting devices, such as light emitting diodes (LEDs). The lighting devices may be disposed on the track 102 opposite the carts 104, such that the lighting devices direct light waves to the carts 104 on the portion the track 102 directly below. In some embodiments, the lighting devices are configured to create a plurality of different colors and/or wavelengths of light, depending on the application, the type of plant being grown, and/or other factors. While in some embodiments, LEDs are utilized for this purpose, this is not a requirement. Any lighting device that produces low heat and provides the desired functionality may be utilized.

Also depicted in FIG. 1 is a master controller 106. The master controller 106 may include a computing device, a nutrient dosing component, a water distribution component, and/or other hardware for controlling various components of the assembly line grow pod 100. As an example, a water distribution component, a nutrient distribution component, an air distribution component, etc. may be included as part of the master controller 106.

In some embodiments, the master controller 106 may store a master recipe for plants that may dictate the timing and wavelength of light, pressure, temperature, watering, nutrients, molecular atmosphere, and/or other variables the optimize plant growth and output. For example, the master recipe dictates lighting requirements on the third day of a particular plant at the assembly line grow pod 100, different lighting requirements on the fourth day of the plant, etc. As another example, the master recipe dictates watering needs, nutrient feeds, etc. directed to plants carried on the carts at particular locations for a particular day counted from the date that plants are introduced into the assembly line grow pod 100. The master recipe is specific, extensive and customized to cover plants supported by the assembly line grow pod 100. By way of example only, the recipe may have instructions to assist 1500 carts simultaneously operating in the assembly line grow pod 100 and carrying diverse population of plants. In some embodiments, the master controller 106 may store specific recipes such as a watering recipe, a nutrient recipe, a dosage recipe, a wave recipe, a temperature recipe, a pressure recipe, etc.

In some embodiments, the master recipe may take any form of a structured set of data, a database, etc. such that data is organized into rows, columns, and table. Additionally, or alternatively, the master recipe may be structured to facilitate the storage, retrieval, modification, addition, and deletion of data through data processing operations.

In some embodiments, the master controller 106 reads information from the master recipe and adjust the information based on known locations of plants at the assembly line grow pod 100. For example, the master controller 106 may identify the plants location based on a cart identifier which is indicative of the growth stage of the plants in the assembly line grow pod 100. Once plants enter into the assembly line grow pod 100, plants move along the spiral tracks from the ascending side to the descending side until plants arrive at the harvest stage. Thus, the location of the carts carrying plants may indicate the growth stage of plants at the assembly line grow pod 100. Then, the master controller 106 may apply the master recipe relevant to the stage of the plants, such as lighting, watering, pressure, and/or wave requirements, specific to plants growing on the fourth day at the assembly line grow pod 100.

The master controller 106 processes the master recipe and controls various components of the assembly line grow pod 100. To reduce the processing load, for example, processing the master recipe and all related events for a large number of simultaneously operating carts carrying the diverse population of plants, the master controller 106 may distribute different and specific functions to several control modules, such as a valve controller, a dosage controller, a pump controller, etc. These control modules work autonomously, complete task(s) and report to the master controller 106. In some embodiments, the control modules may be configured as hardware modules with their own set of instructions in order to improve stability and avoid pushed updates and modifications. In other embodiments, other configurations of the control modules are available.

Figure 2:
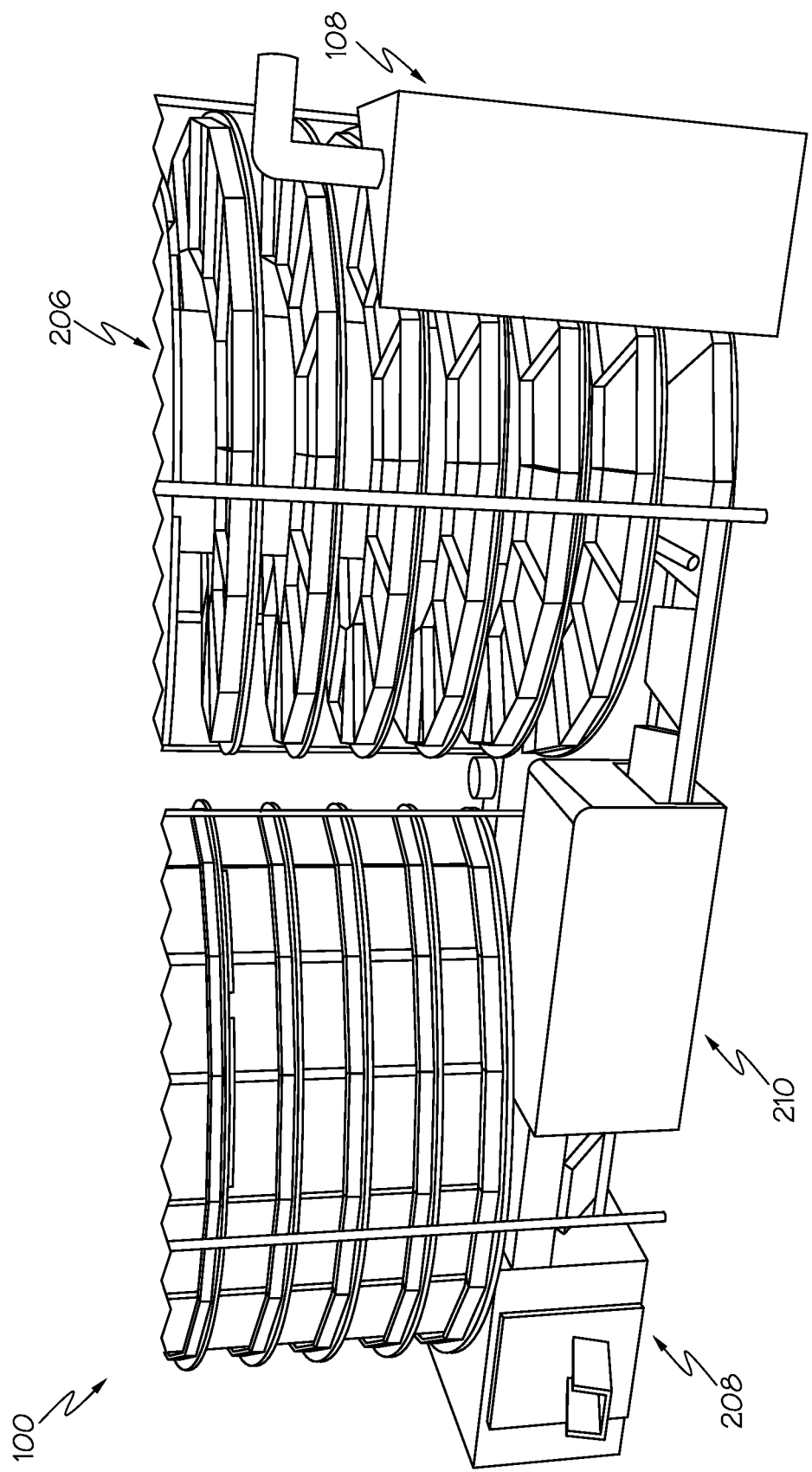
FIG. 2 depicts a plurality of components for an assembly line grow pod, according to embodiments described herein.

Coupled to the master controller 106 is a seeder component 108, as shown in FIGS. 1 and 2. The seeder component 108 may be configured to seed one or more carts 104 as the carts 104 pass the seeder in the assembly line. Depending on the particular embodiment, each cart 104 may include a single section tray for receiving a plurality of seeds. Some embodiments may include a multiple section tray for receiving individual seeds in each section (or cell). In the embodiments with a single section tray, the seeder component 108 may detect presence of the respective cart 104 and may begin laying seed across an area of the single section tray. The seed may be laid out according to a desired depth of seed, a desired number of seeds, a desired surface area of seeds, and/or according to other criteria. In some embodiments, the seeds may be pre-treated with nutrients and/or anti-buoyancy agents (such as water) as these embodiments may not utilize soil to grow the seeds and thus might need to be submerged.

In the embodiments where a multiple section tray is utilized with one or more of the carts 104, the seeder component 108 may be configured to individually insert seeds into one or more of the sections of the tray. Again, the seeds may be distributed on the tray (or into individual cells) according to a desired number of seeds, a desired area the seeds should cover, a desired depth of seeds, etc.

The watering component may be coupled to one or more water lines 110, which distribute water and/or nutrients to one or more trays at predetermined areas of the assembly line grow pod 100. In some embodiments, seeds may be sprayed to reduce buoyancy and then flooded. Additionally, water usage and consumption may be monitored, such that at subsequent watering stations, this data may be utilized to determine an amount of water to apply to a seed at that time.

Also depicted in FIG. 1 are airflow lines 112. Specifically, the master controller 106 may include and/or be coupled to one or more components that delivers airflow for temperature control, pressure, carbon dioxide control, oxygen control, nitrogen control, etc. Accordingly, the airflow lines 112 may distribute the airflow at predetermined areas in the assembly line grow pod 100.

FIG. 2 depicts a plurality of components for an assembly line grow pod 100, according to embodiments described herein. As illustrated in FIG. 2, the seeder component 108 is illustrated, as well as a lighting device 206, a harvester component 208, and a sanitizer component 210. As described above, the seeder component 108 may be configured to seed the trays of the carts 104. The lighting devices 206 may provide light waves that may facilitate plant growth. Additionally, as the plants are lighted, watered, and provided nutrients, the carts 104 will traverse the track 102 of the assembly line grow pod 100. Additionally, the assembly line grow pod 100 may detect a growth and/or fruit output of a plant and may determine when harvesting is warranted. If harvesting is warranted prior to the cart 104 reaching the harvester, modifications to a recipe may be made for that particular cart 104 until the cart 104 reaches the harvester. Conversely, if a cart 104 reaches the harvester and it has been determined that the plants in that cart 104 are not ready for harvesting, the assembly line grow pod 100 may commission that cart 104 for another lap. This additional lap may include a different dosing of light, water, nutrients, etc. and the speed of the cart could change, based on the development of the plants on the cart. If it is determined that the plants on a cart 104 are ready for harvesting, the harvester component 208 may facilitate that process.

In some embodiments, the harvester component 208 may simply cut the plants at a predetermined height for harvesting. In some embodiments, the tray may be overturned to remove the plants from the tray and into a processing container for chopping, mashing, juicing, etc. Because many embodiments of the assembly line grow pod 100 do not use soil, minimal (or no) washing of the plants may be necessary prior to processing.

Similarly, some embodiments may be configured to automatically separate fruit from the plant, such as via shaking, combing, etc. If the remaining plant material may be reused to grow additional fruit, the cart 104 may keep the remaining plant and return to the growing portion of the assembly line. If the plant material is not to be reused to grow additional fruit, it may be discarded or processed, as appropriate.

Once the cart 104 and tray are clear of plant material, the sanitizer component 210 may be implemented to remove any particulate, plant material, etc. that may remain on the cart 104. As such, the sanitizer component 210 may implement any of a plurality of different washing mechanisms, such as high pressure water, high temperature water, and/or other solutions for cleaning the cart 104 and/or tray. In some embodiments, the tray may be overturned to output the plant for processing and the tray may remain in this position. As such, the sanitizer component 210 may receive the tray in this position, which may wash the cart 104 and/or tray and return the tray back to the growing position. Once the cart 104 and/or tray are cleaned, the tray may again pass the seeder, which will determine that the tray requires seeding and will begin the process of seeding.

Figure 3:
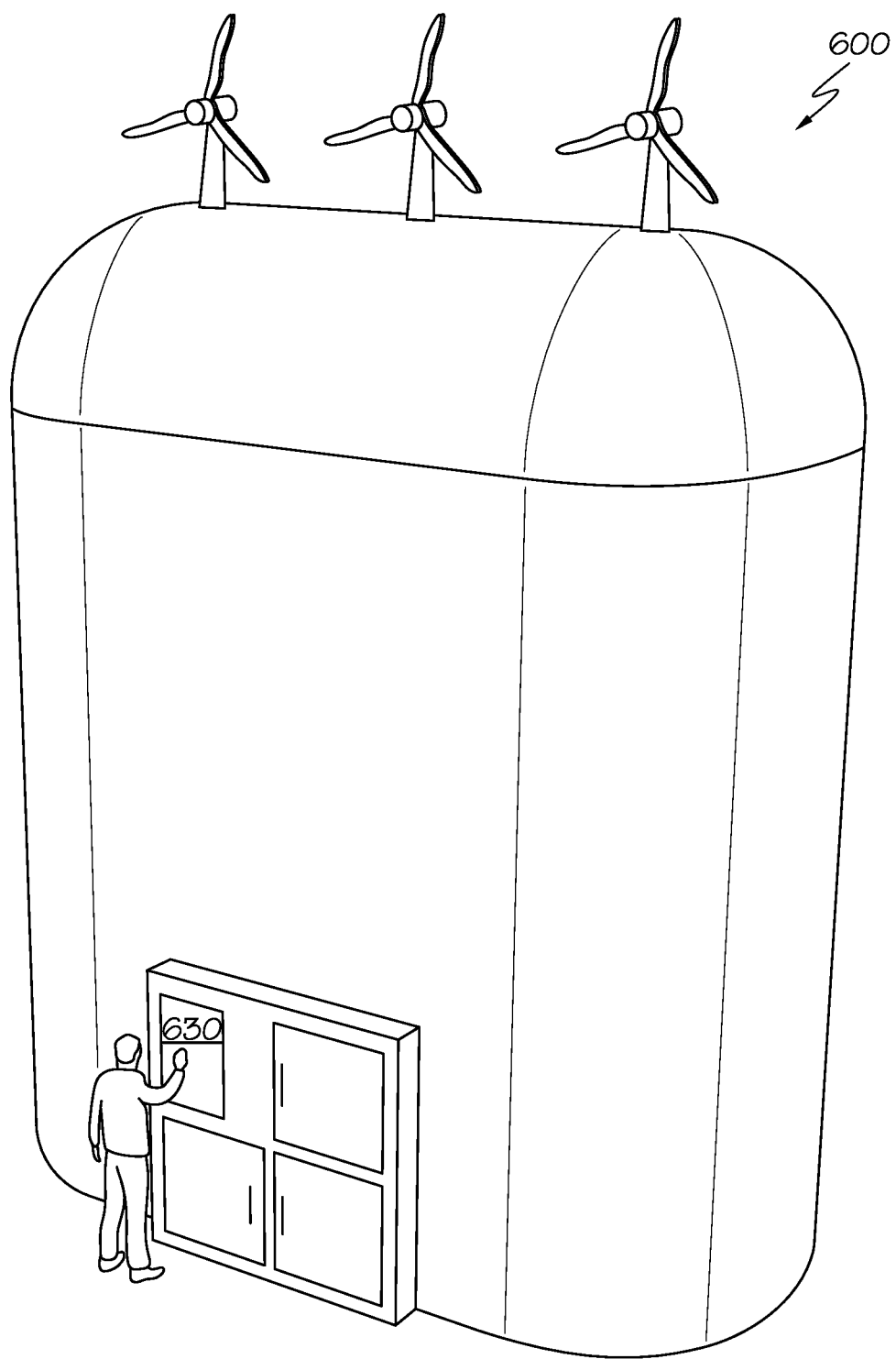
FIG. 3 depicts an exterior enclosure for an assembly line grow pod, according to embodiments described herein.

FIG. 3 depicts an exterior enclosure 300 for a grow pod 100, according to embodiments described herein. As illustrated, the assembly line grow pod 100 may be fully enclosed by the exterior enclosure 300. Depending on the embodiment, the exterior enclosure 300 may provide a pressurized environment to prevent (or at least reduce) insects, mold, and/or other organisms from entering the exterior enclosure 300. The exterior enclosure 300 also keeps the assembly line grow pod 100 at a certain air pressure level.

As shown in FIG. 3, the exterior enclosure 300 includes a control panel 630 at the front side thereof. A user may access the control panel 630 to adjust settings, provide an input, and monitor the conditions, such as pressure level and other environmental conditions within the exterior enclosure 300. The surface of the exterior enclosure 300 may be smooth, or corrugated. The exterior enclosure 300 may be made from air proof material, such as concrete, steel, plastic, etc. As shown in FIG. 3, the exterior enclosure 300 has curved corners which may be suitable and customized to enclose the assembly line grow pod as illustrated in FIGS. 1 and 2.

Figure 4:
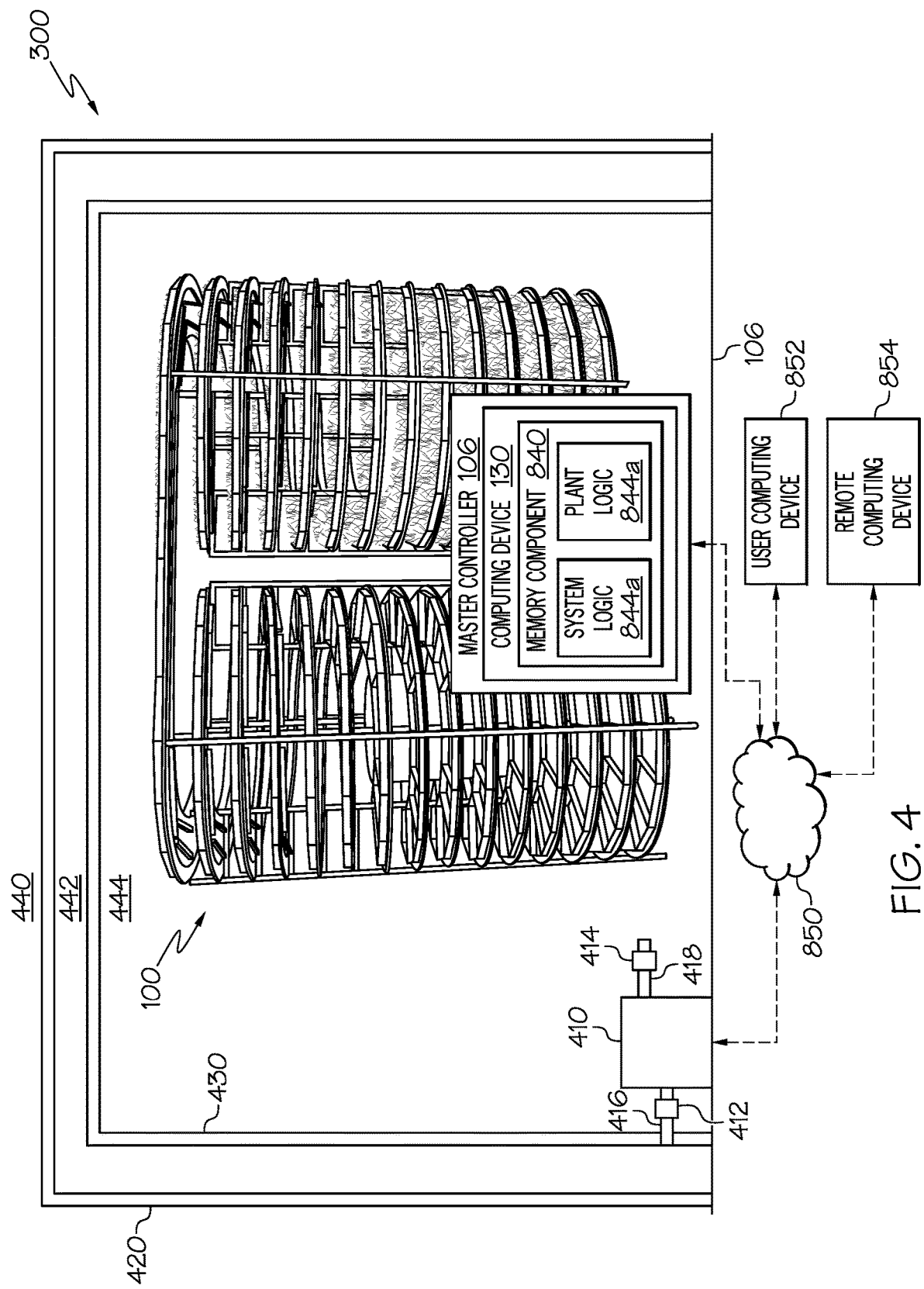
FIG. 4 depicts a cross-section of the exterior enclosure for the grow pod, according to embodiments described herein.

FIG. 4 depicts a cross-section of the exterior enclosure 300 for the grow pod, according to embodiments described herein. The exterior enclosure 300 may include dual walls, such as an outer wall 420 and an inner wall 430. The outer wall 420 and the inner wall 430 may be made of any material that prevents air passing through the wall, e.g., concrete, steel, plastic, etc. Outside the outer wall 420 is an exterior area 440. Between the outer wall 420 and the inner wall 430 is a first sealed area 442. The first sealed area 442 is sealed by the outer wall 420 and the inner wall 430. Inside the inner wall 430 is a second sealed area 444. The second sealed area 444 is sealed by the inner wall 430. Although the first sealed area 442 is a sealed area, insects, mold, and/or other organisms may enter into the first sealed area 442 from outside through any gaps or holes. Maintaining the pressure of the first sealed area higher than the pressure of the exterior area 440 may prevent (or at least reduce) insects, mold, and/or other organisms from entering the exterior enclosure 300. Thus, the pressure of the first sealed area is maintained to be higher than the pressure of the exterior area 440. In some embodiments, the exterior enclosure 300 may include more than two layers in order to further prevent external contaminants from entering the exterior enclosure 300.

The air pressure controller 410 is configured to control the air pressure in the first sealed area 442 and the air pressure in the second sealed area 444. The air pressure controller 410 may be a part of HVAC system for the assembly line grow pod 100, which controls temperature, airflow, etc. In some embodiments, the air pressure controller 410 may be a separate device from the HVAC system. The air pressure controller 410 includes a first air channel 416 and a second air channel 418. The first air channel is connected to the first sealed area 442. The second air channel 418 is exposed to the second sealed area 444. The air pressure controller 410 may include an air pressure decreasing device, e.g., a vacuum pump that vacuums air. For example, the air pressure controller 410 vacuums the second sealed area 444 through the second air channel 418 such that the air pressure of the second sealed area 444 is decreased. As another example, the air pressure controller 410 vacuums the first sealed area 442 through the first air channel 416 such that the air pressure of the first sealed area 442 is decreased.

The air pressure controller 410 may include an air pressure increasing device, e.g., a compressor that outputs compressed air. For example, the air pressure controller 410 outputs compressed air through the first air channel 416 into the first sealed area 442, such that the air pressure in the first sealed area 442 is increased. As another example, the air pressure controller 410 outputs compressed air through the second air channel 418 into the second sealed area 444, such that the air pressure in the second sealed area 444 is increased. In this regard, the air pressure controller 410 may control the air pressure of the first sealed area 442 and the second sealed area 444, independently. In some embodiments, the first air channel 416 and the second air channel 418 are connected within the air pressure controller 410 such that the air pressure controller 410 pulls air from the second sealed area 444 and outputs the pulled air into the first sealed area 442.

A first air pressure gauge 412 is attached to the air channel 416. The first air pressure gauge 412 measures the air pressure of the first sealed area 442. A second air pressure gauge 414 is attached to the second air channel 418. The second air pressure gauge 414 measures the air pressure of the second sealed area 444. The first air pressure gauge 412, the second air pressure gauge 414, and the air pressure controller 410 may be communicatively coupled to the master controller 106. For example, the first air pressure gauge 412 may transmit the air pressure of the first sealed area 442 to the master controller 106 via wired or wireless communication. Similarly, the second air pressure gauge 414 may transmit the air pressure of the second sealed area 444 to the master controller 106 via wired or wireless communication. The master controller 106 may control the operation of the air pressure controller 410, for example, by sending an instruction to increase or decrease the air pressure in the first sealed area 442 and/or the second sealed area 444.

The master controller 106 may include a computing device 130. The computing device 130 may include a memory component 840 (FIG. 4.) which stores systems logic 844a and plant logic 844b. As described in more detail below, the systems logic 844a may monitor and control operations of one or more of the components of the grow pod 100. For example, the systems logic 844a may monitor and control operations of the air pressure controller 410. The systems logic 844a compares the air pressure of the exterior area 440 with the air pressure of the first sealed area 442, and instructs the air pressure controller 410 to increase the pressure of the first sealed area 442 if the air pressure of the first sealed area 442 is not greater than the air pressure of the exterior area 440 by at least a certain amount. This threshold amount may be predetermined and established based on historical data, plant growth patterns, damages by insects, mold, or any other external factors, etc. Thus, a predetermined pressure gap to be maintained may be stored in the master controller 106 such that the master controller 106 controls the operation of the air pressure controller 410 to maintain the predetermined pressure gap. The plant logic 844b may be configured to determine and/or receive a recipe for plant growth and may facilitate implementation of the recipe via the systems logic 844a. For example, a recipe for a plant determined by the plant logic 844b includes a predetermined air pressure value, and the systems logic 844a may instruct the air pressure controller 410 to adjust the air pressure of the second sealed area 444 based on the predetermined air pressure value. In some embodiments, the recipe for plant growth may dictate the timing and wavelength of light, pressure, temperature, watering, nutrients, molecular atmosphere, and/or other variables the optimize plant growth and output.

Additionally, the master controller 106 is coupled to a network 850. The network 850 may include the internet or other wide area network, a local network, such as a local area network, a near field network, such as Bluetooth or a near field communication (NFC) network. The network 850 is also coupled to a user computing device 852 and/or a remote computing device 854. The user computing device 852 may include a personal computer, laptop, mobile device, tablet, server, etc. and may be utilized as an interface with a user. As an example, a user may send a pressure recipe to the master controller 106 for implementation by the grow pod 100. Another example may include the master controller 106 sending notifications to a user of the user computing device 852.

Similarly, the remote computing device 854 may include a server, personal computer, tablet, mobile device, etc. and may be utilized for machine to machine communications. As an example, if the master controller 106 determines a type of seed being used (and/or other information, such as ambient conditions), the master controller 106 may communicate with the remote computing device 854 to retrieve a previously stored recipe for those conditions. As such, some embodiments may utilize an application program interface (API) to facilitate this or other computer-to-computer communications.

Figure 5:
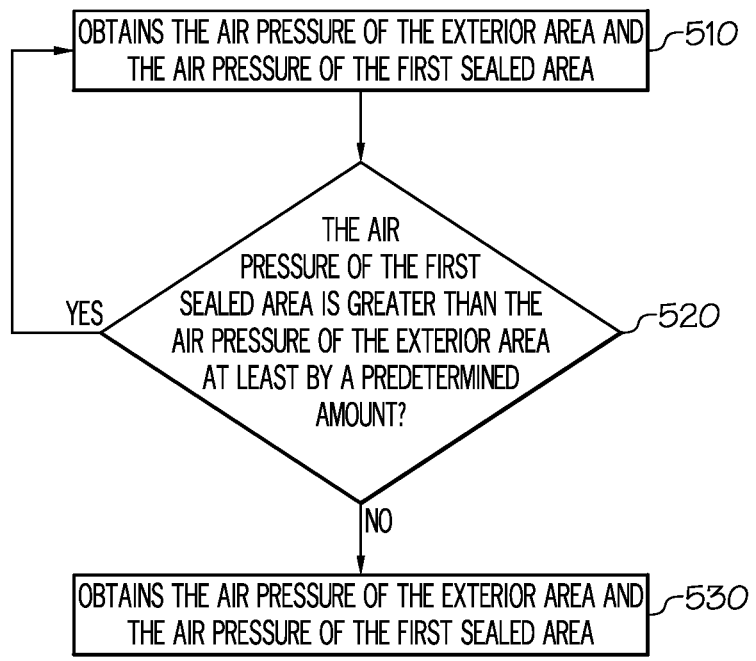
FIG. 5 depicts a flowchart for controlling air pressure inside the exterior enclosure, according to embodiments described herein.

FIG. 5 depicts a flow chart for controlling the air pressure of the first sealed area 442. In block 510, the master controller 106 obtains the air pressure of the exterior area 440 and the air pressure of the first sealed area 442. For example, the master controller 106 receives the air pressure of the exterior area 440 from an air pressure gauge located outside the exterior enclosure 300. As another example, an operator of the grow pod 100 may input the air pressure of the exterior area 440 to the master controller 106. The operator of the grow pod 100 may input the air pressure of the exterior area 440 via the user computing device 852, the remote computing device 854, or the control panel 630 arranged on the surface of the exterior enclosure 300 as shown in FIG. 3. The master controller 106 may receive the air pressure of the first sealed area 442 from the first air pressure gauge 412.

In block 520, the master controller 106 determines whether the air pressure of the first sealed area 442 is greater than the air pressure of the exterior area 440 at least by a predetermined amount. In some embodiments, the predetermined amount may be set as an air pressure difference between the first sealed area 442 and the exterior area 440 that efficiently minimizes the entering of contaminants including insects, mold, and/or other organisms. In other embodiments, the predetermined amount may be set as a range that indicates an optimal pressure value for preventing entry of unwanted external factors. If it is determined that the air pressure of the first sealed area 442 is greater than the air pressure of the exterior area 440 at least by the predetermined amount, the master controller 106 continues to monitor the air pressure of the first sealed area 442. In some embodiments, it is determined that a difference between the first air pressure and the external air pressure is outside of the predetermined air pressure range. In other embodiments, it is determined whether the first air pressure is lower than the external air pressure and the difference between the first air pressure and the external air pressure is outside of the predetermined air pressure range. In further other embodiments, it is determined whether the first air pressure is higher than the external air pressure and the difference between the first air pressure and the external air pressure is outside of the predetermined air pressure range.

If it is determined that the air pressure of the first sealed area 442 is not greater than the air pressure of the exterior area 440 at least by the predetermined amount, in block 530, the master controller 106 instructs the air pressure controller 410 to output compressed air into the first sealed area 442 until the air pressure of the first sealed area 442 is greater than the air pressure of the exterior area 440 by the predetermined amount. By adjusting the lower pressure to maintain the pressure of the first sealed area 442 higher than the pressure of the exterior area 440 at least by the predetermined amount, the exterior enclosure 300 may prevent (or at least reduce) insects, mold, and/or other organisms from entering the exterior enclosure 300. In other embodiments, the pressure of the first sealed area 442 is maintained such that the difference between the pressure of the first sealed area 442 and the air pressure of the external area 440 may be within the predetermined air pressure range.

In some embodiments, the air pressure controller 410 may control the air pressure of the first sealed area 442 without communicating with the master controller 106. That is, the air pressure controller 410 may determine whether the air pressure of the first sealed area 442 is greater than the air pressure of the exterior area 440 at least by a predetermined amount, and control the air pressure of the first sealed area 442 based on the determination. In these embodiments, the air pressure controller 410 may include a processor and a memory (not shown) for storing data relating to the predetermined air pressure amount and programs that, upon execution by the processor, determine and adjust the air pressure of the first sealed area 442 with reference to the air pressure of the exterior area 440.

Figure 6:
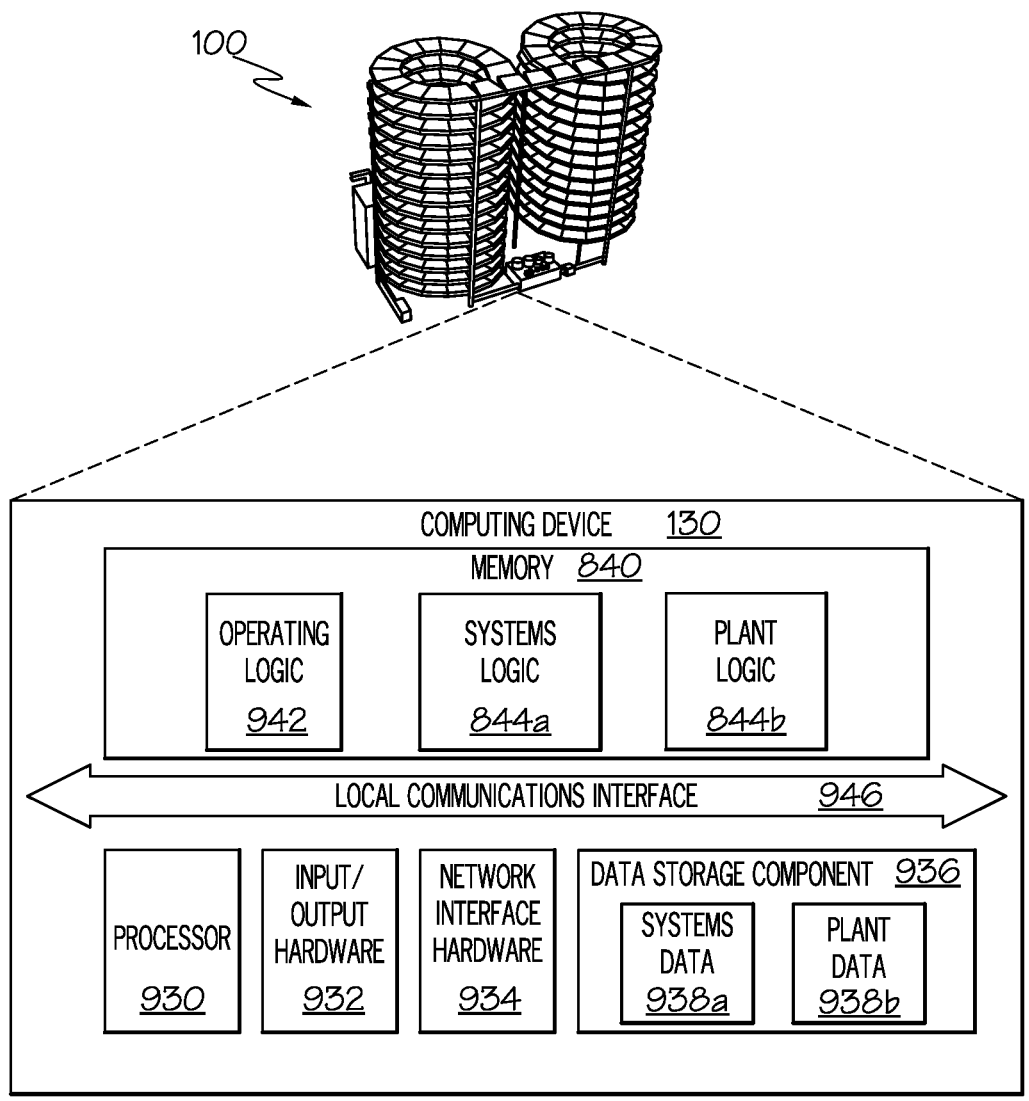
FIG. 6 depicts a computing device for an assembly line grow pod, according to embodiments described herein.

FIG. 6 further depicts the computing device 130 for an assembly line grow pod 100, according to embodiments described herein. As shown in FIG. 4, the master controller 106 is implemented with the computing device 130. FIG. 6 further shows in detail various components of the computing device 130. In other embodiments, the computing device 130 may be configured to operate as a discrete control module that performs specific functions of controlling air pressure in the first and the second sealed areas 442, 444. More specifically, the master controller 106 is configured as a modular control interface and may delegate specific functions to different control modules. These control modules may be received into a plurality of bays with which the master controller 106 is equipped. These control modules may be removed from the bays for repair, reprogramming, upgrade, replacement, etc. without affecting or changing the operations of the master controller 106 and the remaining control modules.

As illustrated, the computing device 130 includes a processor 930, input/output hardware 932, the network interface hardware 934, a data storage component 936 (which stores systems data 938a, plant data 938b, and/or other data), and the memory component 840. The memory component 840 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the computing device 130 and/or external to the computing device 130.

The memory component 840 may store operating logic 942, the systems logic 844a, and the plant logic 844b. The systems logic 844a and the plant logic 844b may each include a plurality of different pieces of logic, each of which may be embodied as a computer program, firmware, and/or hardware, as an example. A local interface 946 is also included in FIG. 6 and may be implemented as a bus or other communication interface to facilitate communication among the components of the computing device 130.

The processor 930 may include any processing component operable to receive and execute instructions (such as from a data storage component 936 and/or the memory component 840). The input/output hardware 932 may include and/or be configured to interface with microphones, speakers, a display, and/or other hardware.

The network interface hardware 934 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the computing device 130 and other computing devices, such as the user computing device 852 and/or remote computing device 854.

The operating logic 942 may include an operating system and/or other software for managing components of the computing device 130. As also discussed above, systems logic 844a and the plant logic 844b may reside in the memory component 840 and may be configured to perform the functionality, as described herein.

It should be understood that while the components in FIG. 6 are illustrated as residing within the computing device 130, this is merely an example. In some embodiments, one or more of the components may reside external to the computing device 130. It should also be understood that, while the computing device 130 is illustrated as a single device, this is also merely an example. In some embodiments, the systems logic 844a and the plant logic 844b may reside on different computing devices. As an example, one or more of the functionalities and/or components described herein may be provided by the user computing device 852 and/or remote computing device 854.

Additionally, while the computing device 130 is illustrated with the systems logic 844a and the plant logic 844b as separate logical components, this is also an example. In some embodiments, a single piece of logic (and/or or several linked modules) may cause the computing device 130 to provide the described functionality.

As illustrated above, various embodiments for pressurizing a grow pod are disclosed. These embodiments create a quick growing, small footprint, chemical free, low labor solution to growing microgreens and other plants for harvesting. These embodiments may create recipes and/or receive recipes that dictate the timing and wavelength of light, pressure, temperature, watering, nutrients, molecular atmosphere, and/or other variables the optimize plant growth and output. The recipe may be implemented strictly and/or modified based on results of a particular plant, tray, or crop.

Accordingly, some embodiments may include a pressure control system that includes an exterior enclosure for enclosing a grow pod, and an air pressure controller, wherein the exterior enclosure includes an outer wall and an inner wall;

and the air pressure controller controls an air pressure of a first sealed area between the outer wall and the inner wall such that the air pressure of the first sealed area is greater than the air pressure of an exterior area outside the outer wall at least by a predetermined amount.

In the embodiments described above, the inner wall defines a second sealed area where an assembly line grow pod is arranged. The air pressure controller is connected with and controlled by a master controller for controlling the entire operations of an assembly line grow pod. The air pressure controller and the master controller are located in the second sealed area.

The air pressure controller includes a first channel coupled to the first sealed area and a second channel coupled to the second sealed area. The master controller periodically monitors air pressure of the first sealed area and controls and instructs the air pressure controller to increase or decrease air pressure in the first sealed area. Upon receipt of instructions to increase air pressure in the first sealed area, the air pressure controller provides compressed air to the first sealed area via the first channel. Upon receipt of instructions to decrease air pressure in the first sealed area, the air pressure controller vacuums air from the first sealed area via the first channel. Similarly, the second channel may be used to provide compressed air into, or vacuum air from the second sealed area, upon instructions of the master controller on the air pressure controller.

In another embodiment, a method for pressurizing an assembly line grow pod system includes arranging a dual wall including an outer wall and an inner wall, controlling, with an air pressure controller, first air pressure in the first sealed area and second air pressure in the second sealed area, and controlling, with a master controller, operation of the air pressure controller. Arranging the dual wall further includes arranging a first sealed area between the outer wall and the inner wall and arranging a second sealed area in an interior space surrounded by the inner wall. Controlling, with the air pressure controller, first air pressure in the first sealed area and second air pressure in the second sealed area, further includes controlling the first air pressure of the first sealed area higher than pressure of an exterior area to the outer wall by a predetermined amount. Controlling, with the master controller, operations of the air pressure controller further includes controlling operations of the air pressure controller by sending an instruction to increase or decrease the first air pressure in the first sealed area, the second air pressure the second sealed area, or both. The method further includes arranging the master controller and the air pressure controller in the interior space surrounded by the inner wall. In another embodiment, the step of controlling, with the air pressure controller, the first air pressure and the second air pressure, further includes: (i) vacuuming air from the first sealed area to decrease the first air pressure such that the first air pressure of the first sealed area maintained to be is higher than the pressure of the exterior area to the enclosure by the predetermined amount; and (ii) vacuuming air from the second sealed area to decrease the second air pressure in the second sealed area.

In another embodiment, the step of controlling, with the air pressure controller, the first air pressure and the second air pressure, further includes: (i) providing compressed air into the first sealed area such that the first air pressure of the first sealed area is maintained to be higher than the pressure of the exterior area to the enclosure by the predetermined amount; and (ii) providing compressed air into the second sealed area to increase the second air pressure in the second sealed area.

In another embodiment, the step of controlling, with the air pressure controller, the first air pressure and the second air pressure, further includes: controlling the the first air pressure independent of controlling the second air pressure.

In another embodiment, the step of controlling, with the air pressure controller, the first air pressure and the second air pressure, further includes: controlling the the first air pressure independent of controlling the second air pressure. Alternatively, the step of controlling, with the air pressure controller, the first air pressure further includes: pulling air from the second sealed area and outputting the pulled air into the first sealed area such that the first air pressure of the first sealed area is maintained to be higher than the pressure of the exterior area to the enclosure by the predetermined amount.

In another embodiment, the method for pressurizing the assembly line grow pod system further includes arranging an assembly line grow pod in the interior space surrounded by the inner wall.

The system for pressurizing an assembly line grow pod system, includes an enclosure, an air pressure controller and a master controller. The enclosure includes dual walls including an outer wall and an inner wall, a first sealed area arranged between the outer wall and the inner wall, and a second sealed area arranged in an interior space surrounded by the inner wall. The air pressure controller controls first air pressure in the first sealed area and second air pressure in the second sealed area. The air pressure controller further controls the first air pressure of the first sealed area higher than pressure of an exterior area to the enclosure by a predetermined amount. The master controller controls operation of the air pressure controller by sending an instruction to increase or decrease the first air pressure in the first sealed area, the second air pressure in the second sealed area, or both. The master controller and the air pressure controller are arranged in the interior space surrounded by the inner wall.

In another embodiment, the system for pressurizing the assembly line grow pod further includes a first air pressure gauge attached to the first air channel and measures the first air pressure of the first sealed area; and a second air pressure gauge attached to the second air channel and measures the second air pressure of the second sealed area. The first air pressure gauge and the second air pressure gauge are communicatively coupled to the master controller and the air pressure controller.

In another embodiment, a pressurizing system for use in an assembly line grow pod, includes a first sealed area and a second sealed area. The first sealed area has air pressure set to be higher than external air pressure. The second sealed area is surrounded by the first sealed area and houses an assembly line grow pod. The pressurizing system further includes an air pressure controller for controlling the air pressure of the first sealed area and a master controller. The master controller includes a processor and a memory for storing instructions and a predetermined air pressure range indicative of optimal air pressure for the assembly line grow pod. The instructions, upon execution by the processor, perform operations including (i) obtaining the external air pressure; comparing the first air pressure of the first sealed area with the external air pressure; (ii) determining whether the first air pressure is higher than the external air pressure amount; and (iii) upon determination that a difference between the first air pressure and the external air pressure is outside of the predetermined air pressure range, causing the air pressure controller to increase or decrease the air pressure of the first sealed area.

In another embodiment, the instructions, upon execution by the processor, perform operations further including (i) upon determination that the first air pressure is lower than the external air pressure and the difference between the first air pressure and the external air pressure is outside of the predetermined air pressure range, causing the air pressure controller to pull air from the second sealed area into the first sealed area; and (ii) upon determination that the first air pressure is higher than the external air pressure and the difference between the first air pressure and the external air pressure is outside of the predetermined air pressure range, causing the air pressure controller to pull air from the first sealed area into the second sealed area.

In another embodiment, controlling, with the air pressure controller, the first air pressure and the second air pressure, further includes: (i) vacuuming air from the first sealed area to decrease the first air pressure such that the first air pressure of the first sealed area maintained to be is higher than the pressure of the exterior area to the enclosure by the predetermined amount; and vacuuming air from the second sealed area to decrease the second air pressure in the second sealed area.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for pressurizing an assembly line grow pod. It should also be understood that these embodiments are merely exemplary and are not intended to limit the scope of this disclosure.

What is claimed is:

1. A method for pressurizing an assembly line grow pod system, comprising:
   arranging a dual wall including an outer wall and an inner wall, including:
      arranging a first sealed area between the outer wall and the inner wall; and
      arranging a second sealed area in an interior space surrounded by the inner wall;
   controlling, with an air pressure controller, a first air pressure in the first sealed area and second air pressure in the second sealed area, wherein controlling with the air pressure controller includes controlling the first air pressure of the first sealed area higher than a pressure of an exterior area to the outer wall by a predetermined amount; and
   controlling, with a master controller, operations of the air pressure controller by sending an instruction to increase or decrease the first air pressure in the first sealed area, the second air pressure in the second sealed area, or both; and
   arranging the master controller and the air pressure controller in the interior space surrounded by the inner wall.

2. The method of claim 1, wherein controlling, with the air pressure controller, the first air pressure and the second air pressure, further comprises:
   vacuuming air from the first sealed area to decrease the first air pressure such that the first air pressure of the first sealed area is maintained to be higher than the pressure of the exterior area to the enclosure by the predetermined amount; and
   vacuuming air from the second sealed area to decrease the second air pressure in the second sealed area.

3. The method of claim 1, wherein controlling, with the air pressure controller, the first air pressure and the second air pressure, further comprises:
   providing compressed air into the first sealed area such that the first air pressure of the first sealed area is maintained to be higher than the pressure of the exterior area to the enclosure by the predetermined amount; and
   providing compressed air into the second sealed area to increase the second air pressure in the second sealed area.

4. The method of claim 2, wherein controlling, with the air pressure controller, the first air pressure and the second air pressure, further comprises:
   controlling the first air pressure independent of controlling the second air pressure.

5. The method of claim 3, wherein controlling, with the air pressure controller, the first air pressure and the second air pressure, further comprises:
   controlling the first air pressure independent of controlling the second air pressure.

6. The method of claim 1, wherein controlling, with the air pressure controller, the first air pressure further comprises:
   pulling air from the second sealed area and outputting the pulled air into the first sealed area such that the first air pressure of the first sealed area is maintained to be higher than the pressure of the exterior area to the enclosure by the predetermined amount.

7. The method of claim 1, further comprising arranging an assembly line grow pod in the interior space surrounded by the inner wall.

8. A system for pressurizing an assembly line grow pod system, comprising:
   an enclosure comprising:
      dual walls including an outer wall and an inner wall;
      a first sealed area arranged between the outer wall and the inner wall,
      a second sealed area arranged in an interior space surrounded by the inner wall;
   an air pressure controller for controlling a first air pressure in the first sealed area, and a second air pressure in the second sealed area, wherein the air pressure controller controls the first air pressure of the first sealed area higher than a pressure of an exterior area to the enclosure by a predetermined amount; and
   a master controller for controlling the operation of the air pressure controller by sending an instruction to increase or decrease the first air pressure in the first sealed area, the second air pressure in the second sealed area, or both, wherein the master controller and the air pressure controller are arranged in the interior space surrounded by the inner wall.

9. The system of claim 8, wherein the air pressure controller includes a first air channel and a second air channel, and the first air channel is connected to the first sealed area and the second air channel is connected to the second sealed area.

10. The system of claim 8, wherein the air pressure controller includes an air pressure decreasing device that vacuums air.

11. The system of claim 8, wherein the air pressure controller vacuums air from the second sealed area through the second air channel such that the second air pressure of the second sealed area is decreased.

12. The system of claim 8, wherein the air pressure controller vacuums air from the first sealed area through the first air channel such that the first air pressure of the first sealed area is maintained to be higher than the pressure of the exterior area to the enclosure by the predetermined amount.

13. The system of claim 9, wherein the air pressure controller includes an air pressure increasing device that outputs compressed air.

14. The system of claim 13, wherein the air pressure controller outputs the compressed air through the first air channel into the first sealed area, such that the first air pressure of the first sealed area is maintained to be higher than the pressure of the exterior area to the enclosure by the predetermined amount.

15. The system of claim 13, wherein the air pressure controller outputs the compressed air through the second air channel into the second sealed area, such that the second air pressure in the second sealed area is increased.

16. The system of claim 9, wherein the first air channel and the second air channel are connected within the air pressure controller such that the air pressure controller pulls air from the second sealed area and outputs the pulled air into the first sealed area.

17. The system of claim 9, further comprising:
a first air pressure gauge attached to the first air channel and measures the first air pressure of the first sealed area; and
a second air pressure gauge attached to the second air channel and measures the second air pressure of the second sealed area;
wherein the first air pressure gauge and the second air pressure gauge are communicatively coupled to the master controller and the air pressure controller.

18. A pressurizing system for use in an assembly line grow pod, comprising:
a first sealed area having a first air pressure set to be higher than an external air pressure outside of the first sealed area;
a second sealed area surrounded by the first sealed area, the second sealed area housing an assembly line grow pod;
an air pressure controller for controlling the first air pressure of the first sealed area; and
a master controller including a processor and a memory for storing instructions and a predetermined air pressure range indicative of an optimal air pressure for the assembly line grow pod, wherein the instructions, upon execution by the processor, perform operations comprising:
obtaining the external air pressure that is outside of the first sealed area;
comparing the first air pressure of the first sealed area with the external air pressure;
determining whether the first air pressure is higher than the external air pressure amount; and
upon determination that a difference between the first air pressure and the external air pressure is outside of the predetermined air pressure range, causing the air pressure controller to increase or decrease the air pressure of the first sealed area.

19. The pressurizing system of claim 18, wherein the instructions, upon execution by the processor, perform operations further comprising:
upon determination that the first air pressure is lower than the external air pressure outside of the first sealed area and the difference between the first air pressure and the external air pressure is outside of the predetermined air pressure range, causing the air pressure controller to pull air from the second sealed area into the first sealed area; and
upon determination that the first air pressure is higher than the external air pressure and the difference between the first air pressure and the external air pressure is outside of the predetermined air pressure range, causing the air pressure controller to pull air from the first sealed area into the second sealed area.

20. The pressurizing system of claim 18, wherein controlling, with the air pressure controller, the first air pressure and the second air pressure, further comprises:
vacuuming air from the first sealed area to decrease the first air pressure such that the first air pressure of the first sealed area is maintained to be higher than the pressure of the exterior area to the enclosure by the predetermined amount; and
vacuuming air from the second sealed area to decrease the second air pressure in the second sealed area.

* * * * *